Dec. 8, 1959   F. M. GRIFFITHS   2,916,203
NAVIGATIONAL TIME-DISTANCE MAP INSTRUMENT
Filed Sept. 23, 1954
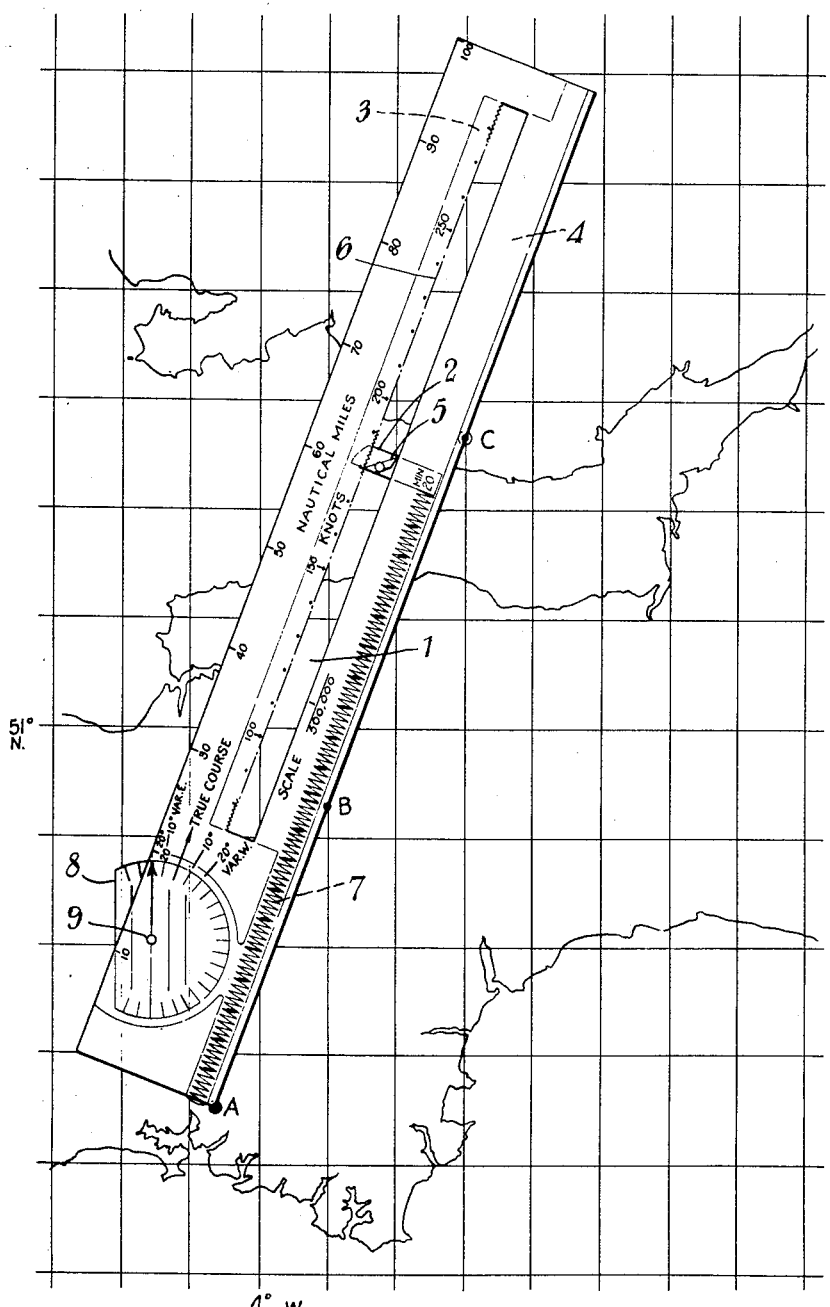
INVENTOR:
F. M. GRIFFITHS
By: Moore & Hall

2,916,203

NAVIGATIONAL TIME DISTANCE MAP INSTRUMENT

Francis Myrddin Griffiths, Middleton-on-Sea, England, assignor to Kelvin & Hughes Limited, Glasgow, Scotland Application September 23, 1954, Serial No. 457,983

Claims priority, application Great Britain September 28, 1953

4 Claims. (Cl. 235—61)

This invention relates to navigational instruments intended principally for use by air navigators.

A rapid and reasonably accurate estimation of ground speed and hence of estimated time of arrival at a given destination is a common requirement for air navigators.

The present invention is directed to the provision of an instrument for use with maps of standard scale and a time measuring instrument, such as a stop-watch whereby extremely rapid estimations of ground speed and estimated time of arrival (E.T.A.) can be made.

A navigational instrument according to the invention comprises essentially a scale graduated in units of speed (knots or K.P.H.) etc. and a uniformly extensible scale graduated in units of time (preferably minutes) attached to the zero end of the speed scale at its own zero end and attached to a cursor at its maximum reading end, the graduations of both scales being selected in relation to the scale of a map or maps with which the instrument is to be used so that the speed indicated by the cursor is the quotient of the distance measured by the extended length of the extensible scale divided by the total number of hours marked off on that scale.

From another aspect the invention provides a navigational instrument, for the estimation of ground speed and E.T.A. for aircraft, having a uniformly extensible time scale attached to a cursor which is slidable in a slot between scales graduated in units of distance and speed, the arrangement being such that tension in the extensible time scale member holds the cursor in accurate scale reading position in the slot.

Preferred forms of instruments in accordance with the invention may incorporate at least a half compass rose pivoted near one end, positioning over the map so that an estimation of the appropriate bearing for a proposed journey may be made by adjusting the North-South edge of the rose into parallel with the grid north lines on the map, while laying off the course with the extreme end of the edge of the rule positioned over an identified point on the map with the rule edge passing over the destination point.

The above and other parts of the invention are embodied in a preferred constructional form of apparatus, designed for use with a 1/500,000 scale map, which will now be described in some detail by way of example with reference to the accompanying drawing which depicts the apparatus superimposed upon a section of a map.

This form of instrument has a body some 14½ inches long and is provided over the greater part of its length with a central longitudinal slot 1. Slidable within the slot is a cursor 2 which extends into channel section spaces 3 and 4 at both sides of the slot.

The cursor has a central part engaged by the slot and this central part is formed with a web 5 transverse to the axis of the limbs and of such length that a force applied in one direction parallel to the axis of the body causes the cursor to jam in the slot with its limbs substantially at right angles to that axis. The jamming of the cursor is made more positive by serrating one internal edge 6 of the slot.

A light tension spring 7 is attached at one end to the "zero" end of the rule and at the other end to one end of the cursor 2.

The spring which is extensible to the full movement of the cursor is under sufficient tension to prevent it becoming slack when at its position of minimum extension, that is to say with the cursor at the "zero" end of its slot.

The spring is shrouded within one of the channel section spaces along side the slot 1 and is thus protected from damage.

The edge of the rule remote from that carrying the spring is graduated on both sides with a scale of distance; in this example nautical miles from 0 to 100.

One edge of the slot 1 is graduated with a scale of speed; in this example 80 to 280 knots with the first graduation adjacent the "zero" end of the cursor slot.

The tension spring 7, which is some 3½ inches long in its condition of least extension, is graduated with a scale of time by marking the appropriate loops; in this example 0 to 20 minutes.

A part circular dial 8, marked as a portion of a compass face on each side, is mounted on pivot 9 near the "zero" end of the rule, and the dial may work in a slot within the body of the rule.

It will be understood that the distance marked off on the distance scale of the instrument corresponds exactly to that on a 1/500,000 map and that since the unit of time represented by the length of the extensible spring is ⅓ hour, the speed in knots marked opposite a given distance reading will always be just three times that reading.

In use the rule may first be employed for setting a rough course from the point of departure A to the point of arrival C by placing the bottom zero edge of the rule over the map, so that the point of departure appears at the zero point and the distance scale crosses the point of arrival; the compass dial attachment is then aligned with the grid north lines on the map and a direct bearing can be read off against a scribed line on the face of the rule. This is merely an auxiliary use of the instrument.

For estimation of the ground speed and E.T.A. of the aircraft it is only necessary to note the time taken to reach a landmark B, place the "zero" end of the speed scale at the point of departure A (as shown in the drawing) with the scale passing over the landmark B on the map, and extend the time scale until the time in minutes expended marked on that scale is over the landmark and the cursor will show the ground speed in knots. The E.T.A. at any point on the course can then be read off directly on the extended time scale by placing the "zero" end of the scale over the landmark on the map and lining up the scale with the point of arrival.

As a specific example; suppose a flight was to be made on a course of 020° and that a landmark on this course were passed in ten minutes after departure. The zero end of the extensible time scale would be placed over the point of departure A on the map and the time scale would be extended until the 10 minute marking was over the landmark B, the cursor would then register the ground speed on the speed scale and be held by its jamming action in that position by the tension of the spring.

Thereafter the zero end of the time scale would be placed over the landmark B on the map and the scale would be aligned at 020° to pass over the point of arrival C. The time registered on the spring opposite the point of arrival C represents the time expected to be expended in reaching that point at the recorded ground speed.

While the invention has been described in detail with respect to a specific instrument designed for use with a specific scale of map, it will be clear that modifications in the units and graduations of the scales and the arrangement of the parts are possible within the scope of the invention.

What I claim is:

1. In combination in a navigational instrument for the estimation of ground speed and the time of arrival of aircraft, comprising a body member having an elongate slot therein with opposed longitudinally extending edges, a scale graduated in units of distance along said instrument and a second scale graduated in units of speed along an edge of said slot, serrations along at least one of said edges, a uniformly extensible time scale mounted at one end on said body member, a cursor attached to said time scale and slidably mounted in said slot, said cursor having a limb providing an attachment point for said time scale offset from the center of the limb, means carried by said cursor for engaging said serrations and holding said cursor in accurate scale reading position in said slot with its limb substantially perpendicular to said graduated scales.

2. The combination set forth in claim 1, said uniformly extensible time scale comprising a tension spring, said spring exerting a force on said cursor causing said means carried by said cursor for engaging said serrations to lock into accurate scale reading position.

3. In a navigational instrument of the kind having an elongated body and a central longitudinal slot therein, a speed scale marked upon one edge of said slot and a resilient, uniformly extensible time scale attached at one end to said body and a cursor slidably mounted in said slot and attached to the free end of said time scale for denoting a reading upon the speed scale, the improvement comprising the attachment of said time scale to a point offset from the center of said cursor and the provision of serrations formed in the edge of the slot, and the provision of a transverse web formed upon said cursor which engages said serrations and adopts a jamming position for maintaining the cursor in accurate reading position when the cursor is positioned to extend the resilient time scale.

4. The combination set forth in claim 3, said resilient, uniformly extensible time scale comprising a tension spring having marking units of time upon regularly spaced coils of said spring.

References Cited in the file of this patent

UNITED STATES PATENTS

| | | |
|---|---|---|
| 101,411 | Bache | Apr. 5, 1870 |
| 683,379 | Byron | Sept. 24, 1901 |
| 1,429,785 | Smith | Sept. 19, 1922 |
| 2,256,116 | Hughes | Sept. 16, 1941 |
| 2,449,342 | Tardif | Sept. 14, 1948 |
| 2,561,020 | Gerber | July 17, 1951 |

FOREIGN PATENTS

| | | |
|---|---|---|
| 600,877 | Great Britain | Apr. 21, 1948 |